April 16, 1963
J. A. SZCZEPANIK ETAL
3,085,518
MULTI-PURPOSE RAILROAD CAR
Filed Sept. 22, 1959
3 Sheets-Sheet 1
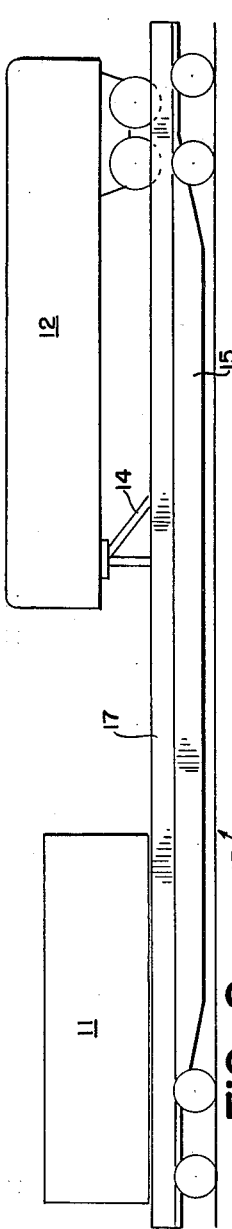
FIG. 1
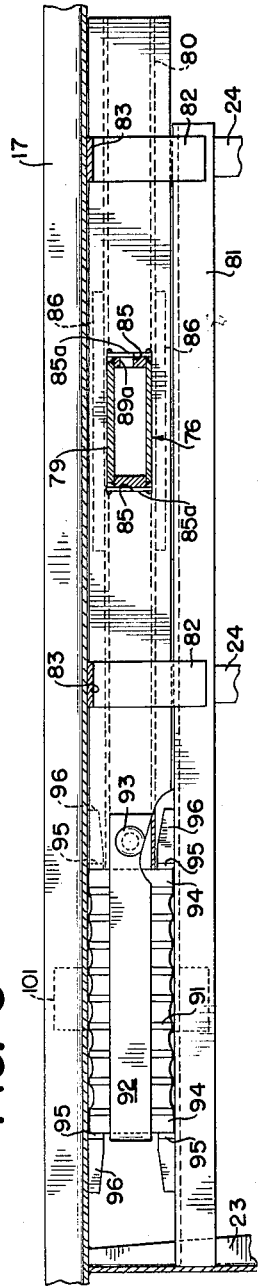
FIG. 8
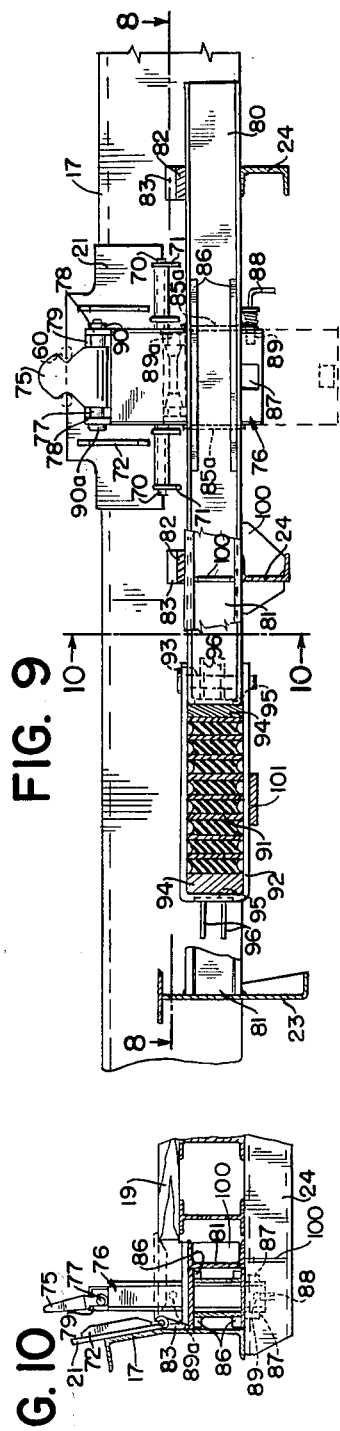
FIG. 9
FIG. 10
INVENTORS
JOHN A. SZCZEPANIK
CARMELO J. NICASTRO
BY *Robert A. Shields*
ATTORNEY

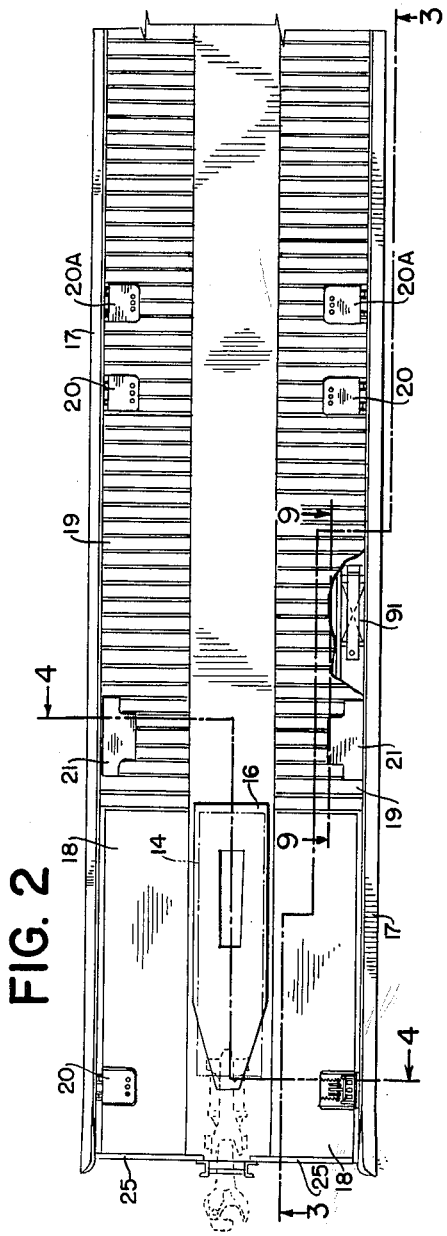
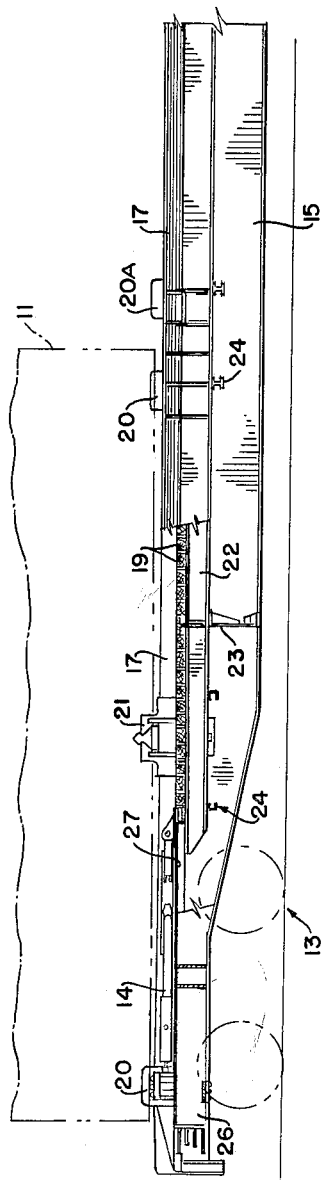

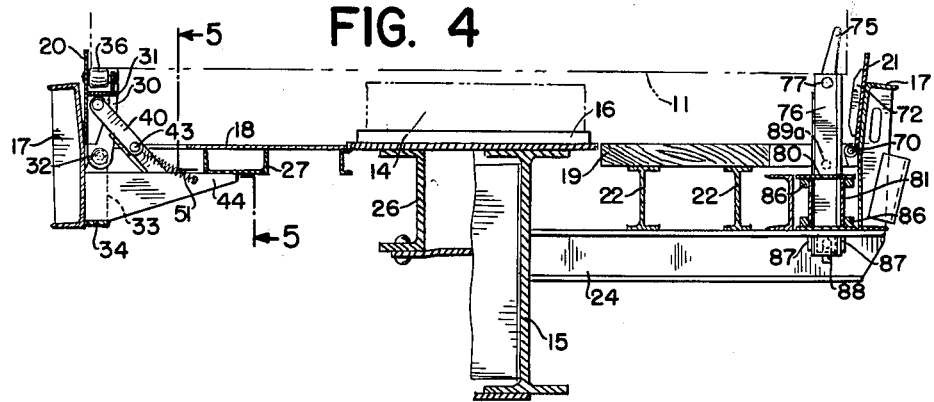

United States Patent Office 3,085,518
Patented Apr. 16, 1963

3,085,518
MULTI-PURPOSE RAILROAD CAR
John A. Szczepanik, Brooklyn, and Carmelo J. Nicastro, Flushing, N.Y., assignors to ACF Industries, Incorporated, New York, N.Y., a corporation of Delaware
Filed Sept. 22, 1959, Ser. No. 841,502
13 Claims. (Cl. 105—366)

This invention relates to railway freight cars, and more particularly to a railway flat car which is convertible for carrying shipping containers and highway trailers.

In such a multi-purpose car it is desirable to provide container supporting and securing elements and trailer supporting and securing elements which are so oriented as to permit their simultaneous or alternate use. Because of longitudinal shock forces which occur during the normal use of railway cars, it is also desirable that these elements permit and control longitudinal movement of the containers and trailers due to such forces. For smooth loading and unloading operations, the various support and securing elements should also provide restriction against vertical and transverse movements of the containers and trailers without the necessity of using extraneous hold down structures. A securing element which meets these requirements with respect to highway trailers is shown and described in detail in pending United States application Serial Number 819,192, filed June 9, 1959.

It is therefore an object of this invention to provide a railway flat car which can also be used for alternately or simultaneously shipping containers and highway trailers. To that end, the container supporting and securing elements of the car of the invention retract below the surface of the deck of the car to permit the formation of a continuous flat load receiving driveway surface to facilitate the use of the car for shipping lading such as machinery and for transporting highway trailers. As highway trailer hitches, even when retracted, project approximately eight inches above the level of the deck, these container supporting and securing elements are provided with an operative raised position above the uppermost surface of a retracted trailer hitch, and where trailer wheel guide walls are used, the elements are provided with a raised position above the guides and the hitch.

It is a further object of this invention that the retractable container supporting and securing elements, when in the raised position above the level of a retracted trailer hitch, permit and control longitudinal movement of containers due to longitudinal shock forces and act to restrain the containers against vertical and transverse movement. To achieve this, container roller supports are provided which permit longitudinal movement of the supported container, and a securing latch, mounted for resilient control of such longitudinal movement, engages a latch socket provided in the container and coacts with the roller supports for the desired restrained movement. The securing latch additionally restrains vertical and transverse movement of the container. In the car of the invention the roller supports also provide restriction against transverse and slewing movement of the container by their lateral mountings which extend above the supporting rollers to provide lateral stops for the container. On the other hand, a plurality of resiliently mounted securing latches may be used which support the container directly. And too, wheeled or caster supported containers may be similarly latch secured to permit longitudinal oscillation of the containers on their own rollers or wheels.

In carrying out the objects of this invention, retractable container supports and securing elements are provided which, even though raised comparatively high above the deck of the car and even though mounted to permit longitudinal shock movement, present a very strong structural support. Furthermore, their retraction and raising is easily accomplished and readily present a flat deck for lading when in the lower position. To this end each roller support is laterally mounted on the undersurface of a floor plate or door which is in turn hingedly attached to the deck of the car adjacent its side. In this way, the continuous flat driveway or loading surface is immediately formed by the roller support floor plates when they are closed into the deck. Furthermore, the floor plate of each roller support assembly forms the lateral extension of the support above the roller element when in the raised or open position. To insure stability of the supports when in the driveway forming position, adjustable brace means are provided which lock the support into its down position.

The height for the securing latches necessary for convertible use of the car of the invention and also maximum strength are obtained without diminishing simplicity and facility of operation by mounting each securing latch upon a strong vertically slidable bar which drops below the surface of the car deck when not in use and is raisable to its proper height bringing the latch into the container socket for securing the container. The bar is mounted on the underframe for limited longitudinal movement and is under restraint by its association with resilient means interposed between it and the underframe. A floor plate or door is hinged adjacent the latch at the side of the car and forms a driveway surface when closed over the lowered latch bar. For compactness, the latch itself may be pivotally attached atop of the slide bar so that it may be folded below the deck when in the dropped position.

A fuller understanding of the invention may be had by referring to the following description taken in conjunction with the accompanying drawings in which:

FIGURE 1 is a diagrammatic side elevation of a flat car utilizing the present invention and simultaneously supporting a highway trailer and a container;

FIGURE 2 is a fragmentary plan view partly broken away of a flat car embodying the present invention with retractable container supports, one of which is in operative position, and with securing mechanisms and a trailer hitch shown diagrammatically in their retracted positions;

FIGURE 3 is a fragmentary side elevation partly broken away of the flat car of FIGURE 1 with the support and securing mechanisms in their raised position and taken substantially along line 3—3 of FIGURE 2;

FIGURE 4 is a section taken along the line 4—4 of FIGURE 2, but showing both the support and securing latch in the raised position while the retracted trailer hitch is shown diagrammatically;

FIGURE 5 is a side elevation of the support shown in FIGURE 4 and taken along the line 5—5 of FIGURE 4;

FIGURE 6 is a section substantially along the line 6—6 of FIGURE 5;

FIGURE 7 shows the support of FIGURE 6 in the retracted position;

FIGURE 8 is a section of the latch mechanism and cushioning unit taken along the line 8—8 of FIGURE 9;

FIGURE 9 is a section partly broken away taken substantially along the line 9—9 of FIGURE 2; and FIGURE 10 is a section taken substantially along the line 10—10 of FIGURE 9.

In FIGURE 1 a container 11 and a highway trailer 12 are carried on a truck mounted railway flat car 13. A retractable trailer hitch 14, fastened to the center sill 15 by means of a plate 16, supports one end of the trailer and when not in use is folded atop the center sill just as a second hitch at the end of the car is folded, as shown in FIGURE 3, so that its top lies in a horizontal plane below the undersurface of the container.

As seen in FIGURE 2, the car presents a flat lading deck or driveway surface from end to end, comprising the top surfaces of the center sill, the metal end zone floor plates 18 on either side of the center sill, and the floor planks 19 in the central zone of the car.

The plank portion of the deck of the car is supported by longitudinally disposed stringers 22 spaced transversely on either side of the center sill. The stringers are supported by the cross bearers 23 and by transversely disposed longitudinally spaced cross ties 24. The cross ties and cross bearers connect the center sill and the side sills 17 as do the end sill beams 25 at the gear housings 26 which form extensions of the center sill at either end of the car. In FIGURE 2 the positioning of the coupler and gear assembly in the gear housings is shown in dotted lines. The end zone floor plates are supported by the center sill, end sill beams and the side sills on either side of the car and are reinforced on their bottom surfaces by longitudinally disposed inverted U-sections 27.

Portions of the flat deck driveway surface or treadways on the sides of the deck over which the wheels of the trailer and tractor pass are formed by the top surfaces of hinged closure plates which comprise, in the railway car shown, a set of four hinged roller support closures 20, and two hinged latch-well closures 21 for each end of the car and another set for the central zone of the car. Only one complete set for one end is shown in FIGURE 2 while two roller support closures 20A of the central set are shown in FIGURES 2 and 3. The roller support closures of each set are spaced longitudinally adjacent the side sills, two on either side of the car and the latch-well closures are placed centrally between them. The closures are hinged for opening upwardly and toward the adjacent side sill and when opened their upper edges extend above the uppermost surface of the retracted trailer hitch and above the side sills which in the car shown extend upwardly to form trailer wheel guide walls as best seen in FIGURES 3 and 4.

It will be seen that because of the closures forming a part of a continuous flat driveway surface, the railway car shown is suitable for general flat car service and is just as suitable for transporting highway trailers.

The cooperation of these closures in assisting in forming a driveway is important in the car shown because of the comparatively large construction of the support and latch mechanisms necessary to support a container high above the deck and above the retracted trailer hitch. Otherwise the latch and support element wells would present a deck with treadways interrupted by substantially large openings.

In FIGURES 4, 5, 6 and 7, a roller support assembly is shown. It comprises the roller support closure 20 centrally secured at its inner surface to the outer edges of the arms 30 and neck 31 of a roller element support yoke. The lower ends of the yoke arms are pivotally mounted at deck level on a pair of pivot pins 32 which are journaled at their ends within two pairs of elongated, vertically oriented and longitudinally spaced butt supports 33 which are connected at their lower ends to a horizontally disposed base 34. The base and the butt supports form a bracket and are secured at their outer edges to the inner surface of the side sill. Horizontally oriented roller elements 36 are rotatably mounted in longitudinal spaced relation upon pivot pins 37 journaled at their ends in the neck 31 of the yoke and in the roller support closure which together form an open topped housing for the roller elements.

The roller support closure extends from the pivotal bracket connection of the yoke arms at deck level past the roller elements to form a lateral stop for blocking transverse or slewing movement of the supported container. When in the closed position, the inner surface of this extension is held tight against a flat deck stop 37 secured to the upper surface of the deck by the use of a spring loaded, center pivoted toggle linkage. A single link 40 is pivotally mounted at one end upon a pin journaled at its ends between a pair of link hinge lugs 41 secured to the roller support closure 20 centrally thereof beneath the roller elements. The other end of the single link 40 pivotally connects on either of its sides the ends of a pair of links 42 by means of a pivot shaft 43 which extends on either side of the connection to form spring connectors. The other ends of the pair of links are pivotally mounted by means of a pivot pin journaled at its ends between the inner ends of a pair of gussets 44 extending from the bracket base to which it is connected, as it is to the side sill of the car to the inner edge of the roller support well to connect with the bottom surface of an inverted U-reinforcement 27 of the floor plate in the end zone of the car and with the bottom surface of the plank deck in the central zone (this connection not shown), thus presenting further reinforcement for the deck at the roller support opening.

The inward extensions of the gussets provide journal openings for a shaft 50 the ends of which extend on either side of the gussets to form spring connectors. Springs or other suitable resilient means 51 are connected at their ends on either side of the gussets to the ends of shaft 50 and to the ends of pivot shaft 43 which is the center pivot of the toggle linkage. An elongated stop block 52 is secured along the outer edge of the single link 40 and another stop block 53 is secured along the corresponding edges of the pair of links 42. As seen in FIGURE 6, their ends are spaced from one another so that they will abut when the roller support closure is swung open and the center pivot of the toggle linkage passes through an arcuate path 54 first upwardly and outboard of the car and then assisted by the inboard urging of the springs upwardly and inboard of the car, past the aligned longitudinal axis 55 of the links. Once the center pivot of the toggle linkage passes the axis and the block ends abut, further travel of the closure is stopped. When the center pivot of the toggle linkage is made to lie at the bottom of the arcuate path, as in FIGURE 7, and the closure is closed, the spring exerts an inboard force on the pivotal connection to effect a restraining or locking of the closure in the down position.

These roller supports, mounted as they are on raisable closures the free ends of which extend in the raised position above the uppermost surface of the retracted trailer hitch and the side sill wheel guides permit the supporting of the containers above the hitch and guides. They also permit the desired longitudinal movement of containers.

Prior to placing the container on the rollers, the latch-well closures 21 are swung open to allow the container securing unit to be raised. Each closure has a turned extension along one margin to form a bearing for a hinge shaft 70. The turned extension is slotted to receive hinge lugs 71 within which the shaft is journaled and which are secured to the side sill of the car at deck level. Door ribs 72 are secured to the inner surface of the closure for reinforcement. In the opened position, the closure is allowed to rest on its outer surface against the side sill.

Once the container is supported on the rollers, it may be moved longitudinally of the car by the operator to align the latch sockets 60 (shown schematically in FIGURE 9) provided in the undersurface of the container, with the latches 75 of the securing units which are then brought upward to engage the socket. Another method of loading the container is to have the latch raised, to lower the container onto the latch and to permit the bearing surfaces of the latch to center the container as it is lowered onto the roller supports.

FIGURES 4, 8, 9 and 10 show the container securing latch unit and cushioning assembly. When in the retracted position below the deck, as indicated in dotted lines in FIGURE 9, the latch 75, contoured for bearing engagement with the socket 60, is folded to a horizontal position beneath the latch well closure 21. It is pivotally mounted atop a vertically oriented elongated bar 76 by means of a pivot shaft 77 journaled at its ends in shoulder extensions 78 of the bar. The shoulder extensions of the bar may be readily positioned higher to receive the weight of the container to be supported but, in the embodiment shown, their purpose is merely to connect the latch in a pivotal manner for folding the latch beneath the level of the deck when not in use. The bar is formed from plates, the outer plate 79 extending above the pivoted connection to the latch to maintain the latch in its up position, that is, slightly tilted outboard of the car and resting at its lower edge against the plate 79 when not engaging the container socket.

The bar is retained for vertical sliding movement in the longitudinally disposed elongated slide 80 of the cushioning unit. The slide is also formed from plates and secured together in an integral structure of box-shaped cross section. It is mounted for longitudinal sliding movement between the side sill and a channel member 81. The channel member is positioned so that its web abuts the elongated member and its lower leg is supported by and secured to two cross ties 24. Gusset plates 100 provide reinforcement of the channel member and cross ties at the points of support as seen in FIGURES 9 and 10. The side sill and channel member restrain the slide from transverse movement. The two cross ties support the slide for longitudinal sliding movement and, with two horizontal plates 82 which are longitudinally spaced above the slide, restrain it from vertical movements. The horizontal plates are attached to the side sill by means of vertical tabs 83 secured to the side sill. The other ends of the plates are secured to the upper leg of the channel member. Slots, indicated at 85, are provided in the upper and lower plates of the slide for retaining the latch bar. Reinforcement strips 86 are provided between the upper plate and side plates and between the lower plate and side plates on either side of the slide at this slotted section. Two vertically disposed latch bar bearing plates 85a are longitudinally spaced within the slots and are secured at their upper and lower ends to the upper and lower plates of the slide to bear against and to permit vertical sliding of the bar.

When the bar is brought to its up position it is restrained from further upward travel by stops 87 secured to the lower inner and outer edges of the bar. In the fully raised position, the upper surfaces of the stops abut the undersurface of the lower plate of the slide. The bar is restrained from downward travel by the latch and socket engagement and by a pin 88 mounted on the undersurface of the bottom plate of the slide adjacent a side plate of the bar. The pin is spring loaded to urge it into a hole, indicated at 89, located adjacent the lower edge of the bar side plate. If the bar is to be positioned higher and is to be used as a support for a container, a substantial stay would be used. When the bar is allowed to retract below deck surface by pulling the pin out of the hole, it rests upon shoulder washer 90 secured to one end of the pivot shaft 77 and to the head of the pivot shaft 90a at the other end and the spring loaded pin is urged into a receiving hole 89a vertically spaced above the hole 89 to restrain the bar from shifting and rattling.

In order to restrain longitudinal movements of the roller supported container in a resilient manner, a resilient element 91 is enclosed within a yoke 92 formed from a single U-shaped plate pivotally attached at its open end to one end of the slide by means of a vertical pin 93 journaled at its ends in bearings provided in the yoke arms and in the upper and lower plates of the slide. The resilient element comprises a series of laminated rubber and steel layers forming a cushion between two followers 94, but any suitable buffer means may be employed. Abutment plates 95 connected to and buttressed by gussets 96, two of which are secured to the side sill and two to the channel member at either end of the resilient element, bear against the end surfaces of the followers adjacent their outer and inner edges to resist outward travel of either end of the element. Inward travel of either end is permitted by the longitudinal movement of the slide and yoke because of the abutting relationship of the inner surface of the closed end of the yoke with the end surface of one follower and the end of the slide with the end surface of the other follower.

To provide support for the resilient element a support plate 101 connects the channel member and the side sill directly beneath the element and abuts the undersurface of the lower arm of the yoke. The end of the channel member housing the resilient element is extended to the cross bearer 23 where it is secured.

In operation, the securing mechanism and cushioning unit respond to longitudinal thrusts of the supported container by resisting longitudinal movement carried through the latch and bar, through the slide and yoke to the resilient element. The tendency of the resilient element to return from compression will in turn return the container to its original position on the rollers. Any weakening of one of the cushioning elements of a set will tend to cause the supported container to slew. This contingency is allowed for by the extension of the roller support closures 20 above the rollers which act to stay the container from excessive arcuate movement as well as from transverse movements as already described.

It is now seen that the invention provides a retractable roller support mechanism for both supporting the weight of a demountable container and preventing its lateral shifting while at the same time allowing longitudinal movement of the container. The retractable latch of the invention linked to a buffer absorbs longitudinal shock forces and anchors the car in transit. Both the support and the securing elements have quick and simple methods of changing to the operative and inoperative positions. When they are in the inoperative position they provide a flat deck for general flat car use and form treadway surfaces, allowing automotive trailers to be readily rolled on and off the car. When they are in operative position they assume a height above the uppermost surface of retracted trailer hitches and of the wheel guides so that the car can be used alternately or simultaneously, when there are several hitches provided on the car, for transporting trailers and containers.

Various modifications of the present invention may be made as they will occur to those skilled in the art without departing from its spirit and scope which is limited only by the following claims.

What is claimed is:

1. A multi-purpose railway car for transporting a highway trailer and a lading container alternately and having a truck mounted underframe with the underframe supporting a flat deck including road vehicle treadways adjacent the sides thereof and the flat deck supporting a retractable trailer hitch between the treadway, said car comprising in combination, roller means carried by the car for supporting the container in spaced relation to the deck for longitudinal movement relative to said car, said roller means being secured to said underframe and raisably mounted thereon and having a lowered position below the top of said flat deck, said roller means also having a raised position projecting above the deck for engaging undersurfaces of the container and for supporting the same a distance above said deck sufficient to clear said trailer hitch in its retracted position, and means securing the container to said car, and resilient means interposed between said underframe and said last mentioned means for restraining said longitudinal movement of the container.

2. A multi-purpose railway car supporting a lading container for longitudinal movement relative thereto, the car having a truck mounted underframe supporting a flat deck including road vehicle treadways adjacent the sides thereof and a retractable trailer hitch supported by the deck between the treadways and also having roller means supporting the container upon the car for longitudinal movement relative thereto, latch means including resilient means connecting said latch means to the car for securing the container to the car while permitting and resiliently controlling said relative longitudinal movement, said roller means being secured to the underframe and raisably mounted thereon below the deck of the car, said roller means being positioned below the deck when lowered and having a raised position projecting above the deck for engaging undersurfaces of the lading container to support the container for said relative longitudinal movement above the deck and above the trailer hitch in its retracted position, and means to hold said roller means in raised position.

3. A multi-purpose railway car comprising in combination, a truck mounted underframe, said underframe supporting a flat deck including road vehicle treadways adjacent the sides thereof, said treadways being formed with spaced openings, a retractable trailer hitch supported by said flat deck between said treadways, closures for said openings, each of said closures being hingedly connected to one end adjacent the sides of said car at deck level, said closures being located in longitudinal spaced relation on either side of said trailer hitch and when closed forming part of said vehicle treadway, lading container supporting and securing elements movable with said closures secured to said underframe and raisably mounted thereon below said flat deck beneath said closures, said elements being positioned below the deck when lowered and having a raised position projecting above the deck for supporting and securing lading containers above said deck and above said trailer hitch in its retracted position when said closure plates are opened and said elements raised.

4. The multi-purpose car of claim 3 wherein said supporting elements are secured to undersurfaces of said closures adjacent their free ends, said closures swing to a vertical position on their hinged connection adjacent the sides of said car and extend above the uppermost surface of said trailer hitch when said trailer hitch is retracted.

5. A multi-purpose railway car for alternately transporting a highway trailer and a lading container, the lading container including means for securing it to said car, said car comprising in combination, a truck mounted underframe, said underframe supporting a flat deck including road vehicle treadways adjacent the sides thereof, a plurality of closures each one of which is hingedly connected adjacent one end to the sides of said car and forming portions of said treadways when in the closed position, roller support means for supporting and permitting longitudinal movement of the lading container on said car, latch means complementary to the means included in the lading container, said roller support means and said latch means being secured adjacent the sides of said car and raisably mounted on said underframe below said flat deck and beneath said closures when closed, said roller support means being raisable into engagement with undersurfaces of the container and said latch means being raisable into engagement with the means included in the lading container, and resilient means mounting said latch means to permit and resiliently control said longitudinal movement of the supported container relative to the car underframe.

6. A multi-purpose railway car supporting a lading container for longitudinal movement thereof relative thereto, the car having a truck mounted underframe supporting a flat deck including road vehicle treadways adjacent the sides thereof, automotive wheel guide walls adjacent the outer side of said treadways, roller means for supporting the lading container upon said car for longitudinal movement relative thereto, latch means including resilient means connecting said latch means to the car for securing the container on the car while permitting and resiliently controlling said relative longitudinal movement, said roller means being secured to the underframe and raisably mounted thereon below the deck of the car, said roller means being positioned below the deck when lowered and having a raised position projecting above the deck for contacting undersurfaces of the lading container to support the container for said relative longitudinal movement above the wheel guide walls and under control of said resilient means.

7. A multi-purpose railway car comprising in combination a truck mounted underframe, said underframe supporting a flat deck including road vehicle treadways adjacent the sides thereof, a retractable trailer hitch supported by said flat deck between said treadways, said flat deck being formed with longitudinally spaced openings along said treadways, closure plates for said openings, said closure plates each being hingedly connected to said car adjacent a side edge of said opening at approximately deck level and when in closed position forming a part of the vehicle treadway, lading container supporting elements fixed to certain of said closure plates at each side of the trailer hitch, said supporting elements being fixed to the inner faces of said closure plates whereby when said plates are closed the supporting elements project below said treadways and when said plates are moved to open position they provide supporting areas for a container positioned above said trailer hitch when the latter is retracted, said supporting elements each including a bearing supporting surface to permit fore and aft movement of a lading container mounted thereon, vertically movable lading container securing means arranged within certain other of said spaced openings, longitudinally moving mounting means for said securing means supported by said underframe, said mounting means being formed with vertical guideways for receiving and guiding said vertically movable securing means whereby said securing means may be elevated into container engaging position or retracted below said deck, and resilient means limiting the fore and aft movement of the longitudinally moving mounting means to limit the fore and aft movement of said securing means, whereby the lading container mounted on the bearing surface of the supporting elements is restricted in its movement.

8. A multi-purpose railway car comprising in combination a truck mounted underframe, said underframe supporting a flat deck including road vehicle treadways adjacent the sides thereof, a retractable trailer hitch supported by said flat deck between said treadways, said flat deck being formed with longitudinally spaced openings along said treadways, closure plates for said openings, said closure plates being hingedly connected to said car adjacent the outer side edge of said openings at approximately deck level and when in closed position forming a part of the vehicle treadways, lading container supporting elements rigidly fixed to the inner faces of certain of said closure plates at each side of the trailer hitch and extending longitudinally of the car structure, said supporting elements including anti-friction bearing portions to permit fore and aft movement of a container mounted thereon and being located inwardly of the free edges of said plates, whereby when said plates are closed they project below said treadways and when said plates are moved to open position they provide horizontal supporting areas for said container positioned above said trailer hitch when the latter is retracted, the projecting edge of said plate extending upwardly of said supporting areas when said plates are in open container-supporting position to form lateral outer guard rails for said container, and cushioned tie down elements carried by said underframe and movable upwardly through certain other of said openings to limit the movement of said container on said bearing surfaces.

9. A multi-purpose railway car comprising in combination a truck mounted underframe, said underframe supporting a flat deck including road vehicle treadways adjacent the sides thereof, a retractable trailer hitch supported by said flat deck between said treadways, said flat deck being formed with longitudinally spaced openings along said treadways, closure plates for said openings, said closure plates being hingedly connected to said car adjacent the outer side edge of said openings at approximately deck level and when in closed position forming a part of the vehicle treadways, and means for connecting said closure plates to the car underframe for securing said plates in open and closed positions, said connecting means each including a pair of pivoted links connected at one end to the inner face of said plates between the container supporting means and its hinge and at the other end to the underframe, spring means connecting the linkage pivot with the underframe, lading container supporting elements rigidly fixed to the inner faces of certain of said closure plates at each side of the trailer hitch and extending longitudinally of the car structure, said supporting elements including anti-friction bearing portions to permit fore and aft movement of a container mounted thereon and being located inwardly of the free edges of said plates, whereby when said plates are closed they project below said treadways and when said plates are moved to open position they provide horizontal supporting areas for said container positioned above said trailer hitch when the latter is retracted, the projecting edge of said plate extending upwardly of said supporting areas when said plates are in open container-supporting position to form lateral outer guard rails for said container, and cushioned tie down elements carried by said underframe and movable upwardly through certain other of said openings to limit the movement of said container on said bearing surfaces.

10. A multi-purpose railway car comprising in combination a truck mounted underframe, said underframe supporting a flat deck including road vehicle treadways adjacent the sides thereof, said treadways being formed with longitudinally spaced openings, a retractable trailer hitch supported by said flat deck between said treadways, closures for said openings, each of said closures being hingedly connected adjacent one side to the sides of the car at deck level, lading container supporting means mounted on certain of said closures at each side of the car, means connecting the closures mounting said lading container supporting means and the underframe of the car to retain said closures in open and closed positions, said last-named means and said lading supporting means being fixed to the inner face of said closures and movable therewith to a position beneath said treadways when the latter are moved to closed position, securing elements positioned for vertical movement through certain other of said openings for connection with a lading container, and longitudinally movable means mounting said securing elements on said underframe, said mounting means including a resilient structure limiting its fore and aft movement.

11. A multi-purpose railway car comprising in combination, a truck mounted underframe, said underframe supporting a flat deck including road vehicle treadways adjacent the sides thereof, said treadways being formed with spaced openings, a retractable trailer hitch supported by said flat deck between said treadways, closures for said openings, each of said closures being hingedly connected adjacent one side to the sides of said car at deck level, said openings and said closures being located in longitudinal spaced relation on either side of said trailer hitch and said closures forming part of said vehicle treadways when moved to closed position, lading container supporting means secured to the under-surface of certain of said closures and adjacent their free ends, whereby said supporting means will be positioned above the uppermost surface of the trailer hitch when the latter is retracted and said closures are swung to a vertical position on their hinged connection, securing elements raisably mounted on the underframe below said flat deck beneath certain other of said closures, said supporting and securing elements having a raised position projecting above the deck for supporting and securing the lading containers above said deck and above said trailer hitch in its retracted position when said closure plates are opened and said elements are raised.

12. In a multi-purpose railway car for supporting a lading container above a retracted trailer hitch mounted on the deck of the railway car, the combination of, a combined latch assembly and cushioning unit for securing the container on the railway car and comprising, a slide member formed with a vertical guideway, an elongated latch element mounted in the guideway of said slide member and perpendicularly movable relative to the slide member, said slide member being mounted upon the underframe of said railway car for longitudinal movement relative thereto, resilient means secured adjacent one side of said slide member for interposition between and connection to the underframe and said slide member, said elongated latch element comprising a latch bar, a latch pivotally supported by said latch bar adjacent the top end thereof whereby said latch may be folded atop said latch bar, and said slide member has vertically oriented bearing surfaces slidably received in said guideway whereby said latch may be raised and lowered relative to the deck of the car and said slide member, said latch being foldable beneath the deck of the car when said latch bar is in lowered position.

13. In a multi-purpose railway car for supporting a lading container above a retracted trailer hitch mounted on the deck of the railway car, the combination of, a roller support for the container comprising, a closure plate hingedly attached to the underframe of the railway car at deck level for swinging movement upwardly and outwardly toward the side of the car, said plate having a free end positioned inwardly of the car side, a roller element rotatably mounted on one side of said plate adjacent said free end, means connecting said closure plate to the underframe for retaining it in a vertical position relative to the deck of the car, said closure plate forming part of the deck when in a closed horizontal position, said means for connecting said closure to the underframe including spring means connecting said plate to the underframe and urging said free end against the deck when said plate is in the closed horizontal position.

References Cited in the file of this patent

UNITED STATES PATENTS

| | | |
|---|---|---|
| 569,094 | Dunlop | Oct. 6, 1896 |
| 1,675,512 | Otis | July 3, 1928 |
| 1,786,495 | Kellett | Dec. 30, 1930 |
| 1,786,620 | Kellett | Dec. 30, 1930 |
| 2,057,223 | Woodruff | Oct. 13, 1936 |
| 2,072,988 | Kellett | Mar. 9, 1937 |
| 2,103,751 | Kellett | Dec. 28, 1937 |
| 2,144,081 | Porte | Jan. 17, 1939 |
| 2,756,073 | Bridge | July 24, 1956 |
| 2,821,152 | Podgajny | Jan. 28, 1958 |
| 2,846,264 | Loomis | Aug. 5, 1958 |
| 2,956,835 | Rogers et al. | Oct. 18, 1960 |

FOREIGN PATENTS

| | | |
|---|---|---|
| 485,962 | Great Britain | May 27, 1938 |

OTHER REFERENCES

Railway Locomotives and Cars (Magazine), May 1958.